(12) United States Patent
Baron et al.

(10) Patent No.: US 11,360,816 B1
(45) Date of Patent: Jun. 14, 2022

(54) DYNAMIC USAGE OF STORAGE AND PROCESSING UNIT ALLOCATION

(71) Applicant: Snap Inc., Santa Monica, CA (US)

(72) Inventors: Bradley Baron, Seattle, WA (US); Benjamin Ralph Hollis, Seattle, WA (US); Peter Cardwell, Bainbridge Island, WA (US); John Krzemien, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 303 days.

(21) Appl. No.: 16/797,608

(22) Filed: Feb. 21, 2020

(51) Int. Cl.
*G06F 9/46* (2006.01)
*G06F 9/50* (2006.01)
*G06F 9/54* (2006.01)
*G06F 9/38* (2018.01)
*G06F 11/30* (2006.01)
*H04M 15/00* (2006.01)
*G06F 9/48* (2006.01)

(52) U.S. Cl.
CPC .......... *G06F 9/5027* (2013.01); *G06F 9/3871* (2013.01); *G06F 9/4837* (2013.01); *G06F 9/5016* (2013.01); *G06F 9/5022* (2013.01); *G06F 9/542* (2013.01); *G06F 11/3006* (2013.01); *H04M 15/58* (2013.01); *G06F 2209/508* (2013.01); *G06F 2209/5014* (2013.01); *G06F 2209/5019* (2013.01)

(58) Field of Classification Search
CPC .... G06F 9/5027; G06F 9/3871; G06F 9/4837; G06F 9/5016; G06F 9/5022; G06F 9/542; G06F 11/3006; G06F 2209/5014; G06F 2209/5019; G06F 2209/508; H04M 15/58
See application file for complete search history.

(56) References Cited

U.S. PATENT DOCUMENTS

| 8,719,415 B1 * | 5/2014 | Sirota | H04L 67/10 709/221 |
| 2021/0064431 A1 * | 3/2021 | Smith | G06F 9/542 |
| 2021/0409270 A1 * | 12/2021 | Bursell | H04L 67/303 |

* cited by examiner

*Primary Examiner* — Diem K Cao
(74) *Attorney, Agent, or Firm* — Schwegman Lundberg & Woessner, P.A.

(57) ABSTRACT

Systems and methods are provided for managing dynamically allocated storage and processing units. The systems and methods include operations for determining, a usage pattern having a peak usage portion and a low usage portion; reserving a first collection of units on a dynamic unit allocation system during the peak usage portion; detecting a transition from the peak usage portion to the low usage portion; in response to detecting the transition, instructing the dynamic unit allocation system to reduce the first collection of units to reserve a second collection of units corresponding to a second amount of the low usage portion; selecting asynchronous tasks that consume a set of units greater than the second collection of units; and during a period of time that the dynamic unit allocation system is reducing the first collection of units, causing the asynchronous tasks to be executed by the dynamic allocation system.

20 Claims, 7 Drawing Sheets

DYNAMIC USAGE OF STORAGE AND PROCESSING UNIT ALLOCATION

TECHNICAL FIELD

The present disclosure generally relates to the technical field of social networks. In particular, the present embodiments are generally directed to managing third-party unit allocation.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user seldom finds a need to remove themselves.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
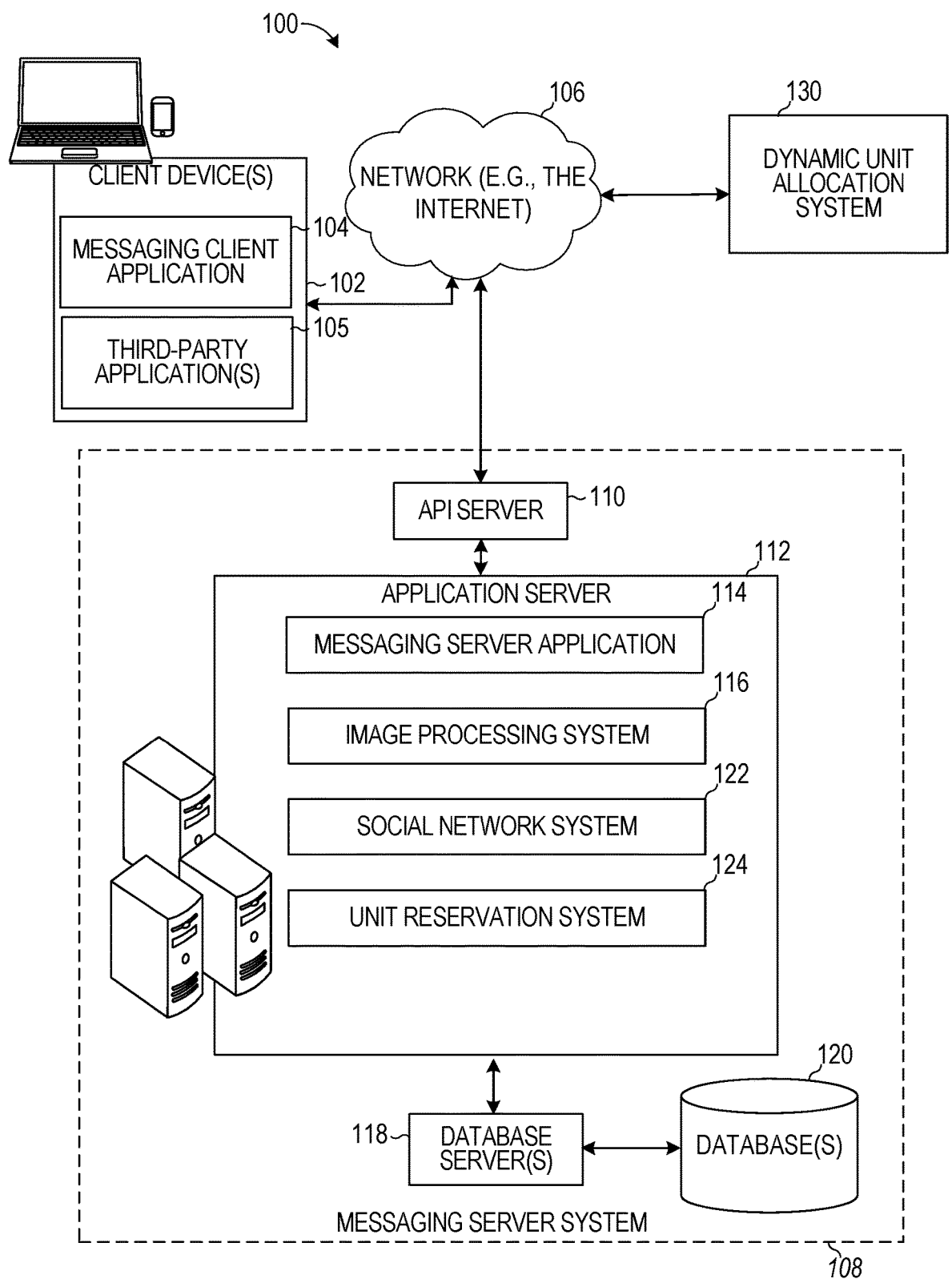
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume media content, and specifically videos, on their mobile device. Such media content is typically exchanged in chat sessions between users. The processing and storage resources consumed by such media content are typically provided by a third-party system. Particularly, a messaging server communicates with a dynamic unit allocation service to obtain access to various storage and processing sources. Once allocated or reserved by the dynamic unit allocation service, the messaging server can use the allocated units to handle the media content being exchanged between users. Typically, messaging servers overcompensate for the amount of units that are allocated by the dynamic unit allocation service to maintain a certain level of quality of service (QoS). Specifically, the messaging servers typically request more units to be allocated by the dynamic unit allocation service than are needed. Such extra units typically go unused which results in wasted resources that could have otherwise been allocated for a different purpose. Also, because the cost for reserving units is typically computed based on the amount of units being reserved, reserving more units than needed results in wasted expenditures.

The disclosed embodiments improve the efficiency of using the electronic device by providing a system that manages the amount of third-party provided units, such as storage and processing resources, based on expected usage patterns of the electronic device. According to the disclosed system, a usage pattern of a computing device is determined, the usage pattern having a peak usage portion and a low usage portion. The computing device reserves a first collection of units, such as storage and/or processing resource units, on a dynamic unit allocation system during the peak usage portion. In response to detecting a transition from the peak usage portion to the low usage portion, the computing device instructs the dynamic unit allocation system to reduce the first collection of units that have been reserved to reserve a second collection of units. The computing devices selects one or more asynchronous tasks that consume a set of units greater than the second collection of units to be executed by the dynamic allocation system during a period of time that the dynamic unit allocation system is reducing the first collection of units.

Namely, the dynamic allocation system can take a certain amount of time or lag in reducing the amount of units allocated to a given computing device after receiving a request to de-allocate or reduce the amount of units. During this period of time, a certain quantity of units, greater than the requested amount of units, remain allocated to the computing device. These units can be used for other purposes by the computing device before they become de-allocated. Such purposes include performing operations or tasks that can be handled out-of-band or anytime and that do not require units to be specifically reserved at a particular time. This increases the efficiencies of the electronic device by reducing the amount of waste in units that are allocated by a dynamic unit allocation service and by reducing the expenditures associated with allocation of the units. This makes such units available for other purposes which decreases processing resources and storage resources needed to accomplish a task.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a unit reservation system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the unit reservation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the unit reservation system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The unit reservation system 124 manages reservation of resource units on the dynamic unit allocation system 130. Specifically, the unit reservation system 124 analyzes usage requirements of various systems of the application server 112 and reserves processing and/or storage resource units on the dynamic unit allocation system 130. In some implementations, rather than utilizing storage and processing resources of the application server 112 itself, one or more processing and/or storage units (referred to as "units") provided by a third-party system, such as the dynamic unit allocation system 130 can be used. This can save costs associated with providing access to various functions of the application server 112.

The dynamic unit allocation system 130 is associated with and is provided by a third-party entity relative to the entity that provides the components of the application server 112. The dynamic unit allocation system 130 receives requests from one or more servers of various entities and allocates, on a time basis, units to the requesting one or more servers. A given unit that is allocated or reserved for a given server is inaccessible to other servers. The dynamic unit allocation system 130 charges a fee to a requesting entity based on the number, amount and/or size of the units that are reserved for the entity at a given time. For example, a given entity may request a first amount of processing units for use during a first time interval from the dynamic unit allocation system 130. The dynamic unit allocation system 130 may charge a first fee for reserving and allocating the first amount of processing units independent of whether such units are actually used. Namely, the fee charged by the dynamic unit allocation system 130 may be based solely on whether units are reserved for a given entity regardless of whether such units are actually used or consumed by the entity during the reserved period. At a later time, the given entity may request a second amount of processing units for use during a second time interval from the dynamic unit allocation system 130. The dynamic unit allocation system 130 may charge a second fee for reserving the second amount of processing units. In some cases, the second amount of processing units may be smaller than the first amount of processing units and, in such cases, the second fee may be lower than the first fee.

In some embodiments, the unit reservation system 124 generates a usage pattern across a number of hours, days, weeks, months, years or other suitable time period. For example, the unit reservation system 124 tracks how much storage and/or processing resources are being consumed on an hourly basis over a given time period. In one example, the unit reservation system 124 generates a model or usage pattern that represents the amount of storage and/or processing resources that are used by the components of the application server 114. The usage pattern may indicate one or more peak usage portions and one or more low usage portions. Specifically, during the daytime hours when a majority of users of the messaging server application 114 are exchanging messages, the usage pattern may indicate a peak usage portion. This is because a greater number of storage and processing resources are needed to be consumed to handle the majority of users exchanging messages. During the nighttime hours, a smaller number of users are exchanging messages which indicates a low usage pattern. As such, during the nighttime hours, the usage pattern may indicate low usage as a fewer number of storage and processing resources are needed to be consumed to handle the small number of users exchanging messages. In one example, the unit reservation system 124 stores this generated usage pattern in usage pattern data 207.

In some embodiments, the unit reservation system 124 requests or reserves a collection of resource units on the dynamic unit allocation system 130 based on the usage pattern that is stored in the usage pattern data 207. The unit reservation system 124 uses the usage pattern to reserve resource units in a way that minimizes the expenses and minimizes the amount of resource units that are reserved such that just enough resource units are reserved on the dynamic unit allocation system 130 to meet the usage demands or needs of the application server 112. In some cases, the unit reservation system 124 determines that a certain period of lag exists between requesting reduction in the number of resource units that are reserved by the dynamic unit allocation system 130 and when the resource units are actually de-allocated or become inaccessible to the unit reservation system 124.

For example, the unit reservation system 124 first requests a first collection of units to be reserved by the dynamic unit allocation system 130. In response to receiving that request, the dynamic unit allocation system 130 immediately provide access to the first collection of units. At a later time, the unit reservation system 124 determines that the usage pattern indicates lower usage needs. As such, at the later time, the unit reservation system 124 instructs the dynamic unit allocation system 130 to reduce the number of units that are allocated or reserved for the unit reservation system 124 to a second collection of units. The dynamic unit allocation system 130 may reduce the fee charged to the entity associated with the unit reservation system 124 starting from the moment the request to reduce the number of units is received. However, the de-allocation process to reduce the number of units may take some time (e.g., 2-3 minutes). During this time period, a transitionary amount of resource units smaller than the initially allocated first collection of units but larger than the second collection of units remains allocated to the unit reservation system 124.

These transitionary amount of resource units are not used to perform any time sensitive processes of the application server 112. The unit reservation system 124 may select one or more asynchronous tasks (such as system level and non-user facing tasks) to perform using these transitionary amount of resource units. In some cases, the amount of resources that need to be consumed by the selected tasks combined with the resources that need to be consumed by the current usage exceeds the size of the second collection of units. The unit reservation system 124 instructs the dynamic unit allocation system 130 to perform these asynchronous tasks and the dynamic unit allocation system 130 uses the transitionary amount of resource units to perform these tasks until the transitionary amount of resources become de-allocated from the unit reservation system 124. Should any of the transitionary amount of resource units become unavailable while the asynchronous tasks are being performed, there is no harm as they can be rescheduled for another time. Such asynchronous tasks can include tasks that need to be performed within 24 hour period or some other time frame and tasks that can be performed at any point in time. For example, the tasks that need to be performed within a 24 hour period can include deletion of one or more messages from a computing device or daily reporting metrics. The tasks that can be performed at any point in time can include generation of analytics of user behavior and error tracking.

Figure 4:
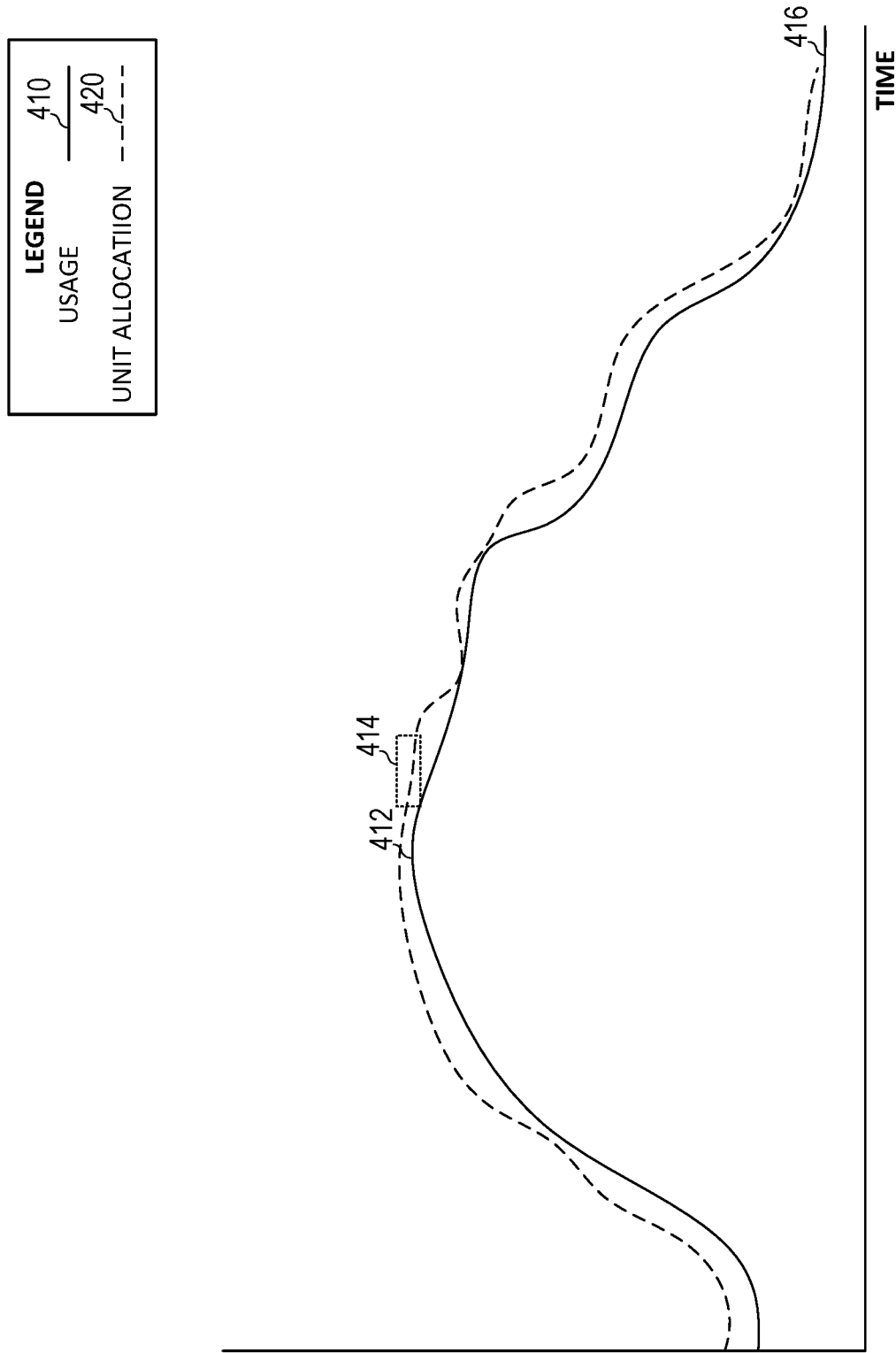
FIG. 4 is a diagram showing dynamic resource unit allocation based on usage needs, according to example embodiments.

In some cases, the unit reservation system 124 receives the usage pattern and identifies a peak usage portion. The peak usage portion may be associated with a usage amount that exceeds other usage amounts that precede and follow the point in time associated with the peak usage amount by a specified period. For example, the unit reservation system 124 identifies peak usage within a 24 hour window indicating the greatest amount of usage relative to other usages within the 24 hour window. Similarly, the unit reservation system 124 may identify a lower or lowest usage (e.g., a usage that is less than the peak usage by a threshold amount) in the usage pattern. The unit reservation system 124 determines that a current usage of the application server 112 matches the peak usage at a point in time during a given day that matches the point in time of specified in the usage pattern. The unit reservation system 124 requests that the dynamic unit allocation system 130 reserve a first collection of units corresponding to the peak usage. For example, as shown in FIG. 4 a usage line 410 is aligned with a unit allocation line 420. The usage line 410 indicates the usage pattern of the application server 112 and the unit allocation line 420 represents the amount of units reserved by the dynamic unit allocation system 130. The unit reservation system 124 may identify a peak usage point 412 and a low usage point 416.

The unit reservation system 124 may also predict or determine that a low usage pattern occurs at a specified point following the peak usage. When the current time reaches the specified point of the low usage pattern, the unit reservation system 124 detects a transition from the peak usage to the low usage. At this time, the unit reservation system 124 requests that the dynamic unit allocation system 130 reduce the first collection of units to a second collection of units that correspond to the low usage amount. After receiving the request to reduce the first collection of units, the dynamic unit allocation system 130 has a lag time 414 in de-allocating the resource units. During this lag time, a certain amount of resource units that exceeds the newly requested and reduced number of resource units remains allocated to the unit reservation system 124. These resource units are used by the unit reservation system 124 to perform asynchronous system level tasks. In some cases, the lag time for reducing the amount of resource units is based on a difference between the number of currently allocated and reserved units and the amount of units in the request for reduction. Namely, if the current number of units is 1 M and the reduced number of units is 100K, a first amount of lag time may be present to de-allocate that 900K units from the 1 M currently allocated. As another example, if the current number of units is 1K and the reduced number of units is 0.5K, a second amount of lag time may be present to de-allocate that 0.5K units from the 1K currently allocated, wherein the second amount of lag is smaller than the first amount of lag.

In some embodiments, the unit reservation system 124 selects one or more of the available asynchronous tasks that need to be completed based on a priority associated with the tasks and/or based on a completion time associated with the tasks. In some cases, tasks that need to be completed earlier than other tasks are prioritized higher and are executed or processed before tasks that need to be completed later. In some cases, the tasks are prioritized based on importance. In such cases, even though a first task may need to be completed later than a second task, the first task is prioritized to be completed earlier than the second task if the first task is relatively more important than the second task that needs to be completed earlier. The unit reservation system 124 may submit the selected one or more asynchronous tasks to be processed by the dynamic unit allocation system 130 sequentially or in parallel. If submitted in parallel, the unit reservation system 124 predicts how many transitionary units remain available to process the asynchronous tasks. The unit reservation system 124 selects the number of asynchronous tasks to send for execution by the dynamic unit allocation system 130 based on the predicted number of transitionary units that remain available while the dynamic unit allocation system 130 is reducing the number of allocated resource units.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data that the first entity collects about various each of the users of a service provided by the first entity. For example, the user data includes user names, passwords, addresses, friends, activity information, preferences, videos or content consumed by the user, and so forth.

Figure 2:
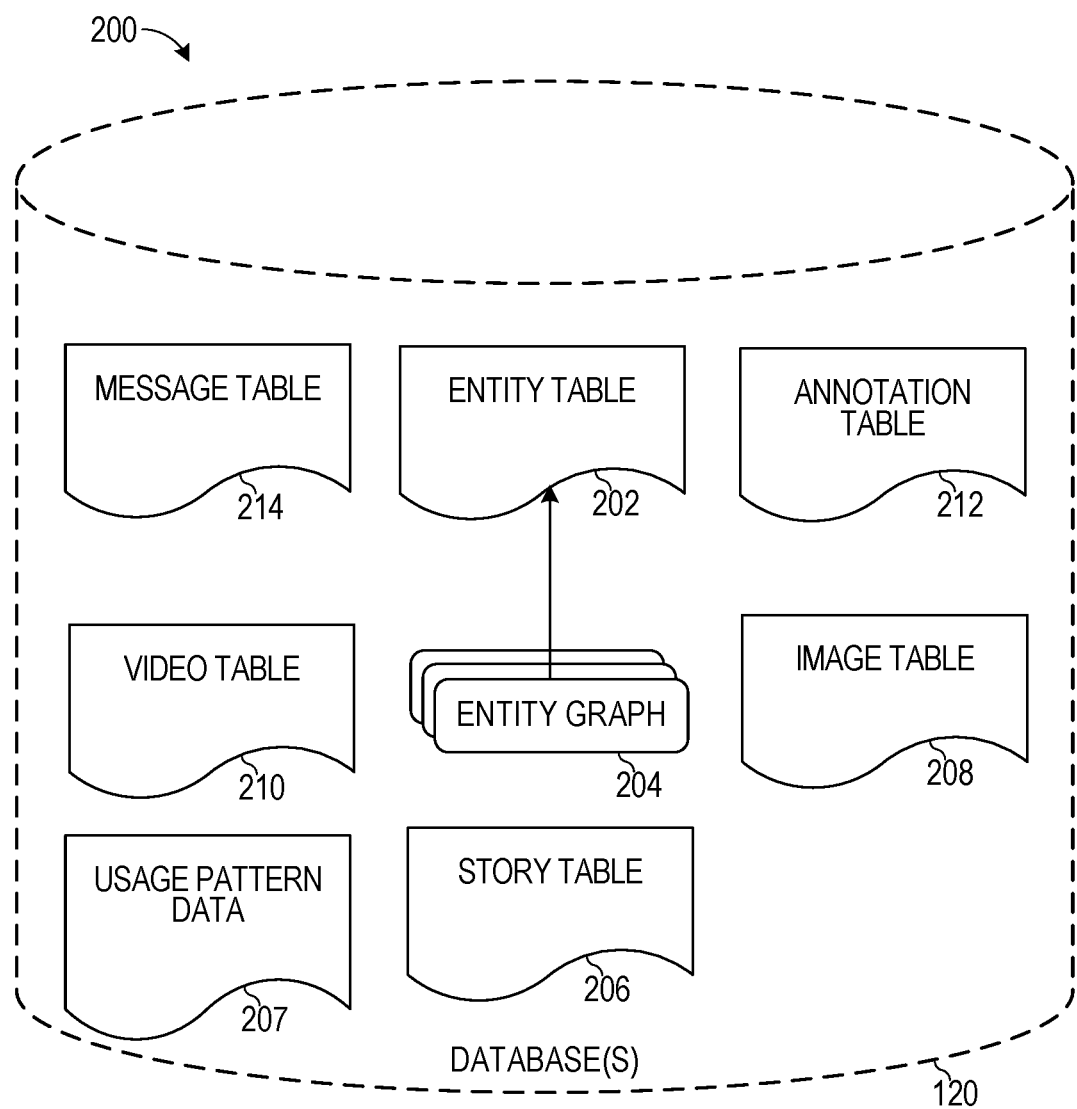
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Usage pattern data 207 stores various information about usage patterns across users of the application server 112 (e.g., the messaging server application 114).

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
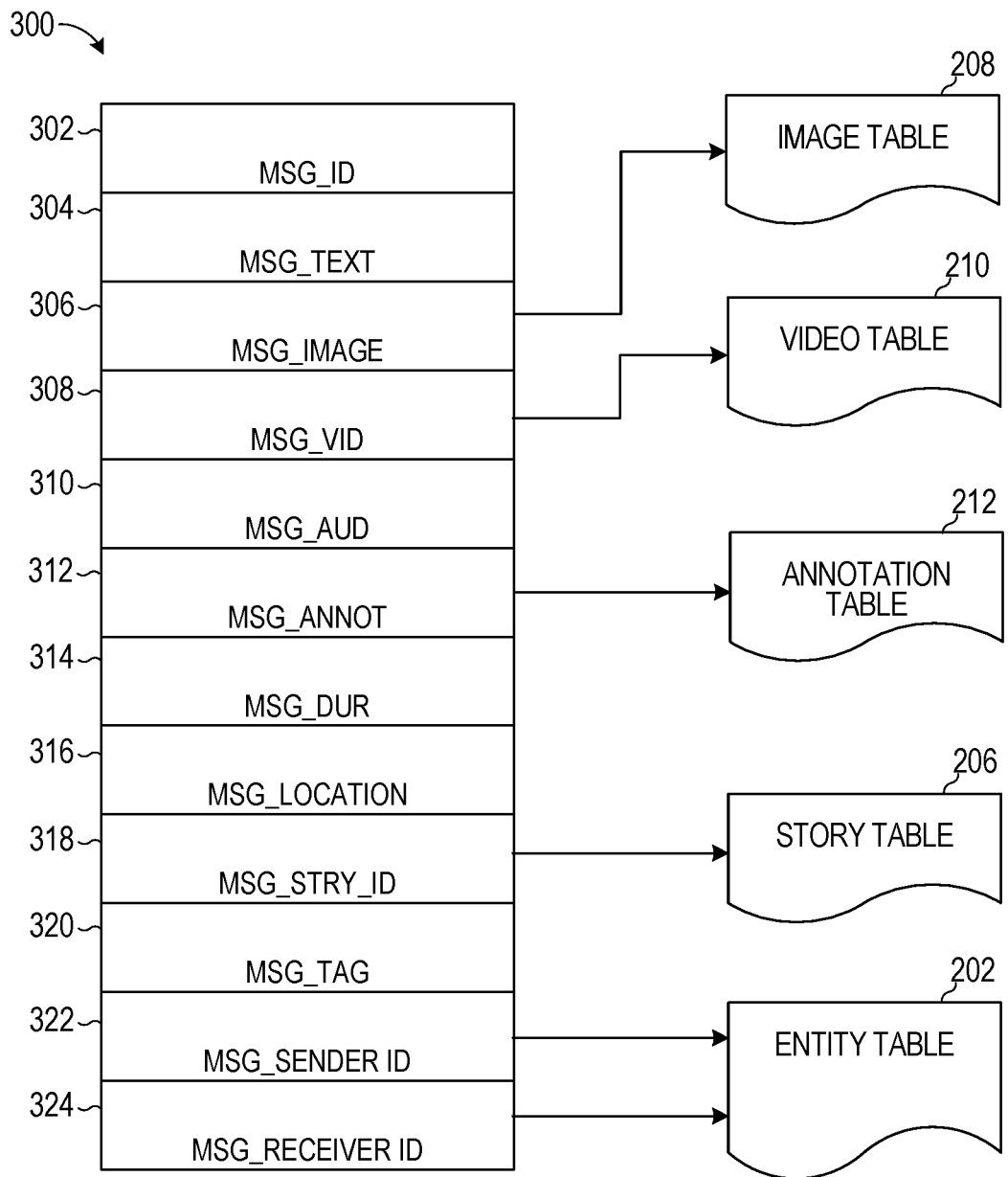
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 5:
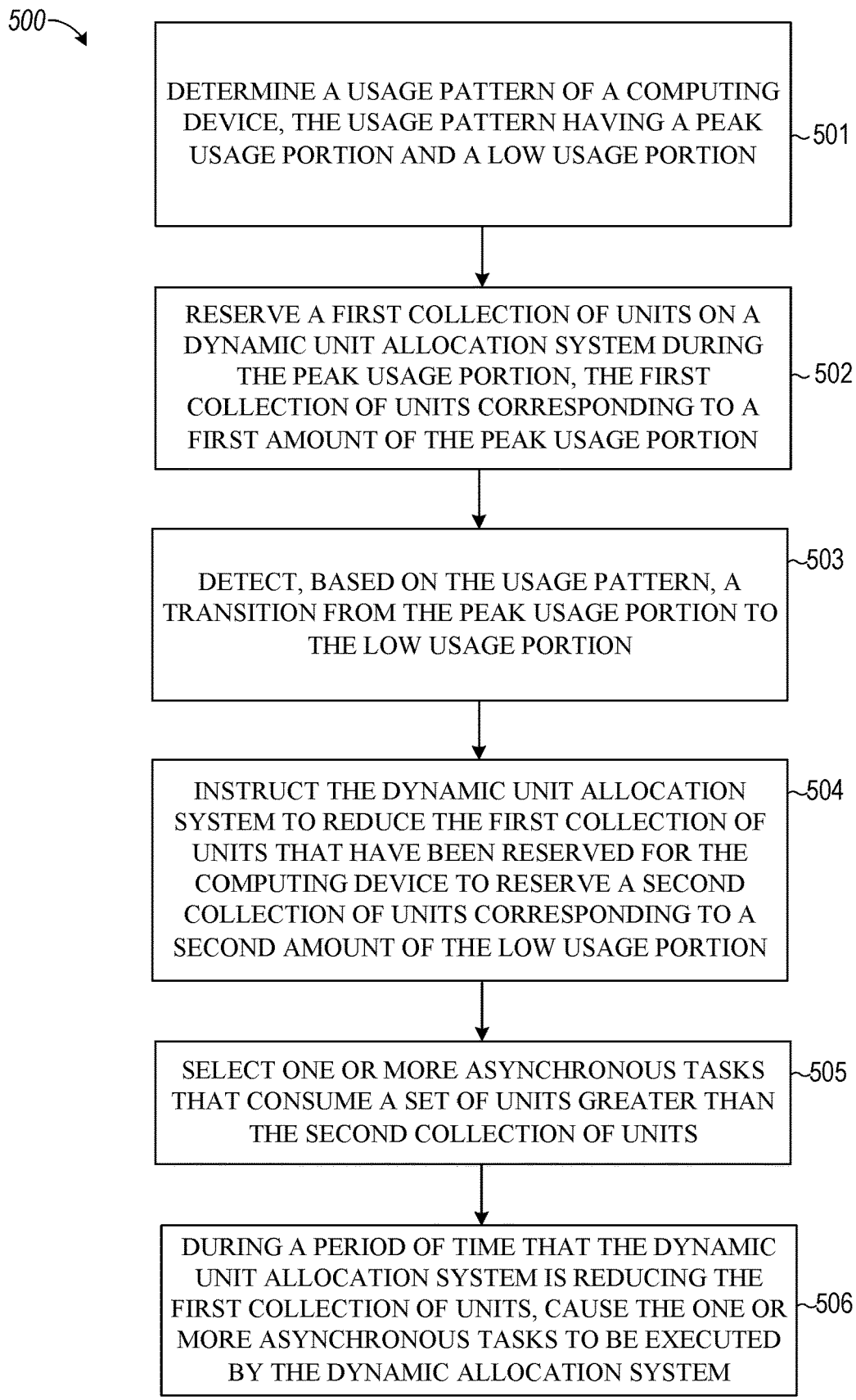
FIG. 5 is a flowchart illustrating example operations of the unit reservation system, according to example embodiments.

FIG. 5 is a flowchart illustrating example operations of the unit reservation system 124 in performing process 500, according to example embodiments. The process 500 may be embodied in computer-readable instructions for execution by one or more processors such that the operations of the process 500 may be performed in part or in whole by the functional components of the messaging server system 108, client device 102, and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the computing system (e.g., application server 112) determines a usage pattern of various components of the application server 112. In one example, the usage pattern comprises a peak usage portion and a low usage portion. For example, the unit reservation system 124 generates a usage pattern of the messaging server system 108 by various users or client devices 102 coupled to the messaging server system 108 across a number of hours, days, weeks, months, years or other suitable time period, as described above.

At operation 502, the computing system reserves a first collection of units on a dynamic unit allocation system during the peak usage portion. In one example, the first collection of units includes a first number of resource units needed to meet the needs of the size or amount of the peak usage portion. For example, the unit reservation system 124 transmits a request to the dynamic unit allocation system 130 to reserve an amount of storage and/or processing units based on the amount of the peak usage.

At operation 503, the computing system detects, based on the usage pattern, a transition from the peak usage portion to the low usage portion. For example, the unit reservation system 124 determines from the usage pattern that a low usage portion will be present or is coming up following the current peak usage portion.

At operation 504, the computing system, in response to detecting the transition, instructs the dynamic unit allocation system to reduce the first collection of units that have been reserved for the computing device to reserve a second collection of units comprising a second number of resource units needed to meet the needs of the size or amount of the low usage portion. For example, the unit reservation system 124 transmits a request to the dynamic unit allocation system 130 to reduce the amount of storage and/or processing units that are currently allocated to a second amount of units based on the amount of the low usage.

At operation 505, the computing system selects one or more asynchronous tasks that consume a set of units greater than the second collection of units. For example, the unit reservation system 124 selects one or more system level and non-user facing tasks where in aggregate the resources that need to be consumed to processes the selected tasks combined with the current usage of the messaging server system 108 exceeds the requested second amount of units.

At operation 506, the computing system, during a period of time that the dynamic unit allocation system is reducing the first collection of units, causes the one or more asynchronous tasks to be executed by the dynamic allocation system. For example, the unit reservation system 124 transmits the selected tasks for execution by the units that remain allocated to the unit reservation system 124 on the dynamic unit allocation system 130.

Figure 6:
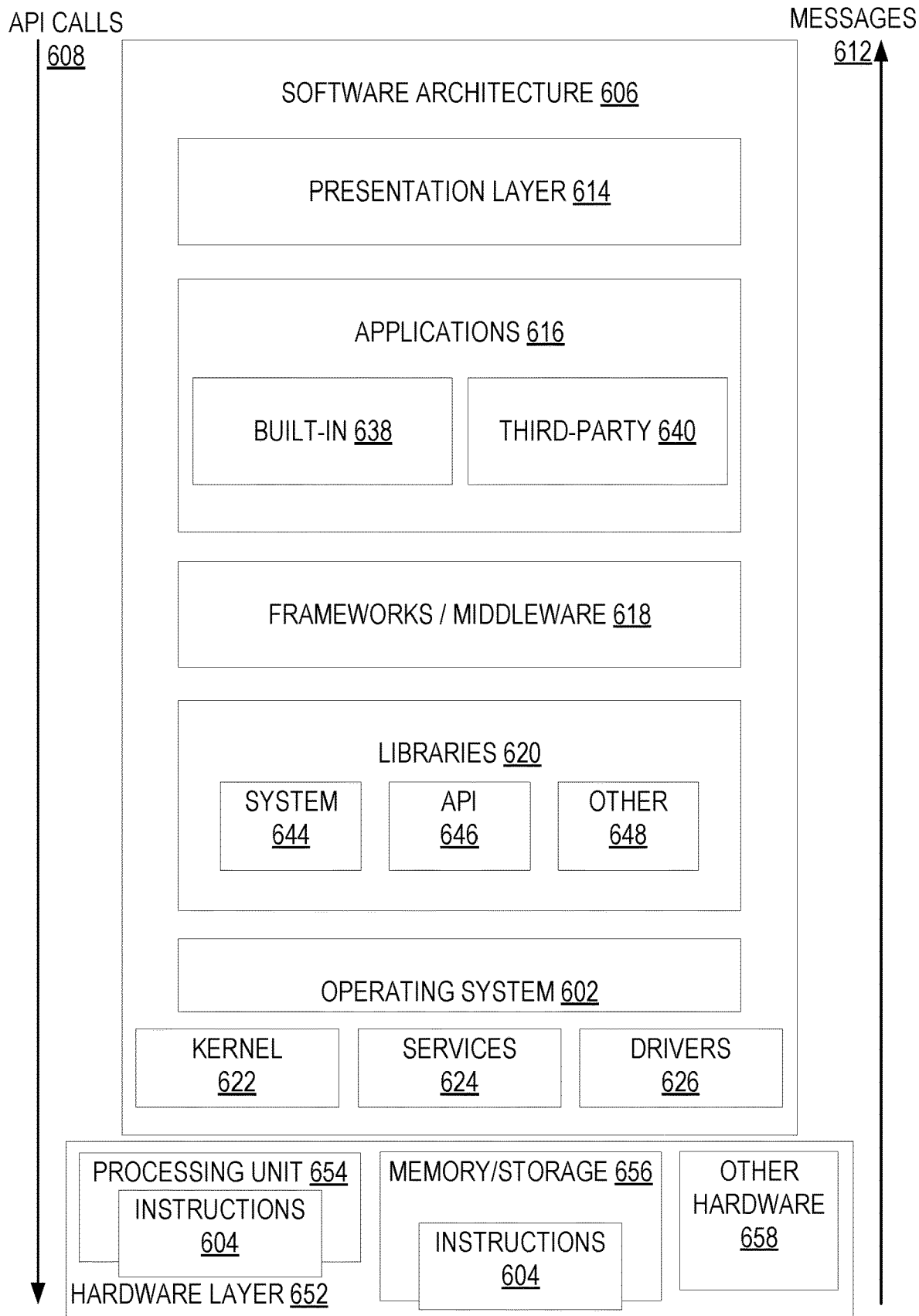
FIG. 6 is a block diagram illustrating a representative software architecture, which may be used in conjunction with various hardware architectures herein described, according to example embodiments.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and input/output (I/O) components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
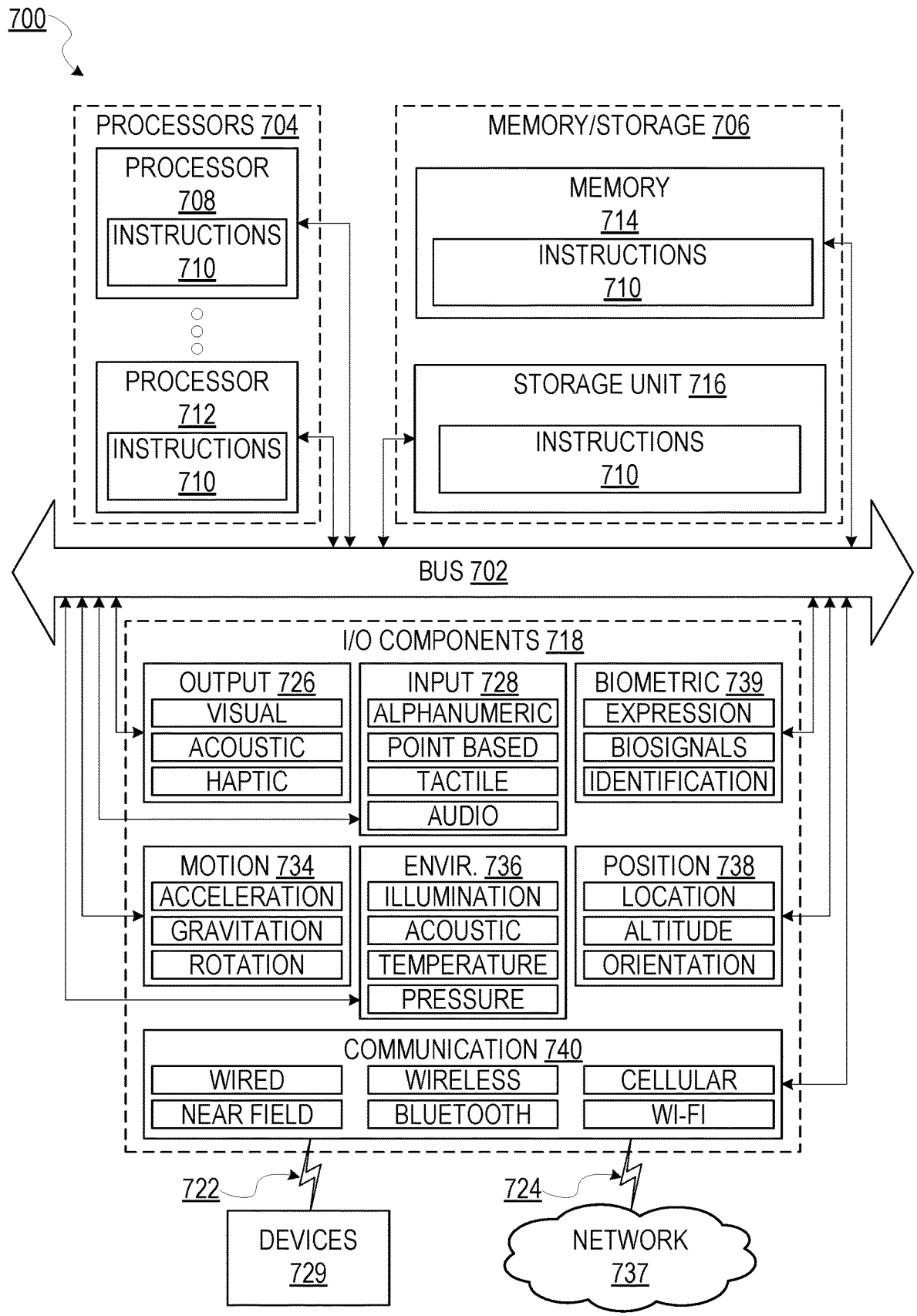
FIG. 7 is a block diagram illustrating components of a machine able to read instructions from a machine-readable medium (e.g., a machine-readable storage medium) and perform any one or more of the methodologies discussed herein, according to example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 708 and a processor 712 that may execute the instructions 710. The term "processor" is intended to include multi-core processors 704 that may comprise two or more independent processors (sometimes referred to as "cores") that may execute instructions 710 contemporaneously. Although FIG. 7 shows multiple processors 704, the machine 700 may include a single processor 708 with a single core, a single processor 708 with multiple cores (e.g., a multi-core processor), multiple processors 708, 712 with a single core, multiple processors 708, 712 with multiple cores, or any combination thereof.

The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 739, motion components 734, environmental components 736, or position components 738 among a wide array of other components. For example, the biometric components 739 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 737 or devices 729 via coupling 724 and coupling 722, respectively. For example, the communication components 740 may include a network interface component or other suitable device to interface with the network 737. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 729 may be another machine 700 or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting a NFC beacon signal that may indicate a particular location, and so forth.

Glossary

"CARRIER SIGNAL," in this context, refers to any intangible medium that is capable of storing, encoding, or carrying transitory or non-transitory instructions 710 for execution by the machine 700, and includes digital or analog communications signals or other intangible medium to facilitate communication of such instructions 710. Instructions 710 may be transmitted or received over the network 106 using a transitory or non-transitory transmission medium via a network interface device and using any one of a number of well-known transfer protocols.

"CLIENT DEVICE," in this context, refers to any machine 700 that interfaces to a communications network 106 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 106.

"COMMUNICATIONS NETWORK," in this context, refers to one or more portions of a network 106 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 106 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM," in this context, refers to a component, device, or other tangible media able to store instructions 710 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 708 or other programmable processor. Once configured by such software, hardware components become specific machines (or specific components of a machine 700) uniquely tailored to perform the configured functions and are no longer general-purpose processors 708. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 708 configured by software to become a special-purpose processor, the general-purpose processor 708 may be configured as respectively different special-purpose processors (e.g., comprising different hardware components) at different times. Software accordingly configures a particular processor 708 or processors 704, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor 708 or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 106 (e.g., the Internet) and via one or more appropriate interfaces (e.g., an API). The performance of certain of the operations may be distributed among the processors, not only residing within a single machine 700, but deployed across a number of machines. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR," in this context, refers to any circuit or virtual circuit (a physical circuit emulated by logic executing on an actual processor 708) that manipulates data values according to control signals (e.g., "commands," "op codes," "machine code," etc.) and which produces corresponding output signals that are applied to operate a machine 700. A processor 708 may, for example, be a CPU, a RISC processor, a CISC processor, a GPU, a DSP, an ASIC, a RFIC or any combination thereof. A processor 708 may further be a multi-core processor having two or more independent processors 704 (sometimes referred to as "cores") that may execute instructions 710 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    determining a usage pattern of a computing device, the usage pattern comprising a peak usage portion and a low usage portion;
    reserving, by the computing device, a first collection of units on a dynamic unit allocation system during the peak usage portion, the first collection of units comprising a first number of resources for processing a first amount of the peak usage portion;
    detecting, by the computing device based on the usage pattern, a transition from the peak usage portion to the low usage portion;
    in response to detecting the transition, instructing the dynamic unit allocation system to reduce the first collection of units that have been reserved for the computing device to reserve a second collection of units comprising a second number of resources for processing a second amount of the low usage portion;
    selecting, by the computing device, one or more asynchronous tasks that consume a set of units greater than the second collection of units; and
    during a period of time that the dynamic unit allocation system is reducing the first collection of units, causing the one or more asynchronous tasks to be executed by the dynamic allocation system.

2. The method of claim 1, further comprising accessing, by the computing device, the dynamic unit allocation system, the dynamic unit allocation system being configured to allocate and de-allocate units to the computing system based on needs of the computing system.

3. The method of claim 1, further comprising:
    determining, by the computing device, a first need for unit allocation based on a first usage amount of the computing device;
    requesting, by the computing device, for the dynamic unit allocation system to allocate the first collection of units based on the first need;
    identifying, by the computing system, that the first usage amount has decreased by a threshold value to a second usage amount; and
    requesting, by the computing device, for the dynamic unit allocation system to allocate the second collection of units by de-allocating a portion of the first collection of units based on a second need corresponding to the second usage amount.

4. The method of claim 1, wherein a cost for accessing the dynamic unit allocation system is based on an amount of units reserved for the computing device, wherein a first cost is associated with the first collection of units and a second cost lower than the first cost is associated with the second collection of units.

5. The method of claim 1, wherein the period of time is fixed based on a difference in the first amount of the peak usage portion and the second amount of the low usage portion.

6. The method of claim 1, wherein the dynamic unit allocation system is associated with a third-party entity relative to an entity associated with the computing device.

7. The method of claim 1, wherein the computing device comprises a messaging application server.

8. The method of claim 7, wherein the peak usage portion corresponds to a first period of time during which a first plurality of users is exchanging messages on the messaging application server, wherein the low usage portion corresponds to a second period of time during which a second plurality of users is exchanging messages on the messaging application server, the second plurality of users has less users than the first plurality of users.

9. The method of claim 1, further comprising measuring usage of the computing device over one or more weeks to determine the usage pattern of the computing device.

10. The method of claim 1, wherein selecting one or more asynchronous tasks comprises:
 identifying a first task associated a first completion period and a second task associated with a second completion period;
 determining that the completion period of the first task is earlier than the second completion period; and
 selecting, as the one or more asynchronous tasks, the first task in response to determining that the completion period of the first task is earlier than the second completion period.

11. The method of claim 10, wherein the first completion period comprises a 24-hour completion window, and wherein the second completion period comprises a completion window of an indefinite length.

12. The method of claim 10, wherein the first task comprises deletion of one or more messages from the computing device or daily reporting metrics, and wherein the second task comprises generation of analytics of user behavior and error tracking.

13. The method of claim 1, wherein the first amount is greater than the second amount by more than a threshold amount.

14. The method of claim 1, wherein the first collection of units comprises at least one of processing resources or storage resources of the dynamic unit allocation system.

15. A system comprising:
 a processor configured to perform operations comprising:
  determining a usage pattern of a computing device, the usage pattern comprising a peak usage portion and a low usage portion;
  reserving, by the computing device, a first collection of units on a dynamic unit allocation system during the peak usage portion, the first collection of units comprising a first number of resources for processing a first amount of the peak usage portion;
  detecting, by the computing device based on the usage pattern, a transition from the peak usage portion to the low usage portion;
  in response to detecting the transition, instructing the dynamic unit allocation system to reduce the first collection of units that have been reserved for the computing device to reserve a second collection of units comprising a second number of resources for processing a second amount of the low usage portion;
  selecting, by the computing device, one or more asynchronous tasks that consume a set of units greater than the second collection of units; and
  during a period of time that the dynamic unit allocation system is reducing the first collection of units, causing the one or more asynchronous tasks to be executed by the dynamic allocation system.

16. The system of claim 15, further comprising operations for accessing, by the computing device, the dynamic unit allocation system, the dynamic unit allocation system being configured to allocate and de-allocate units to the computing system based on needs of the computing system.

17. The system of claim 15, further comprising operations for:
 determining, by the computing device, a first need for unit allocation based on a first usage amount of the computing device;
 requesting, by the computing device, for the dynamic unit allocation system to allocate the first collection of units based on the first need;
 identifying, by the computing system, that the first usage amount has decreased by a threshold value to a second usage amount; and
 requesting, by the computing device, for the dynamic unit allocation system to allocate the second collection of units by de-allocating a portion of the first collection of units based on a second need corresponding to the second usage amount.

18. The system of claim 15, wherein a cost for accessing the dynamic unit allocation system is based on an amount of units reserved for the computing device, wherein a first cost is associated with the first collection of units and a second cost lower than the first cost is associated with the second collection of units.

19. The system of claim 15, wherein the period of time is fixed based on a difference in the first amount and the second amount.

20. A non-transitory machine-readable storage medium that includes instructions that, when executed by one or more processors of a computing device, cause the computing device to perform operations comprising:
 determining a usage pattern of the computing device, the usage pattern comprising a peak usage portion and a low usage portion;
 reserving, by the computing device, a first collection of units on a dynamic unit allocation system during the peak usage portion, the first collection of units comprising a first number of resources for processing a first amount of the peak usage portion;
 detecting, by the computing device based on the usage pattern, a transition from the peak usage portion to the low usage portion;
 in response to detecting the transition, instructing the dynamic unit allocation system to reduce the first collection of units that have been reserved for the computing device to reserve a second collection of units comprising a second number of resources for processing a second amount of the low usage portion;
 selecting, by the computing device, one or more asynchronous tasks that consume a set of units greater than the second collection of units; and
 during a period of time that the dynamic unit allocation system is reducing the first collection of units, causing the one or more asynchronous tasks to be executed by the dynamic allocation system.

\* \* \* \* \*